United States Patent
Li et al.

(10) Patent No.: US 8,669,979 B2
(45) Date of Patent: Mar. 11, 2014

(54) MULTI-CORE PROCESSOR SUPPORTING REAL-TIME 3D IMAGE RENDERING ON AN AUTOSTEREOSCOPIC DISPLAY

(75) Inventors: ChangCheng Li, Beijing (CN); YangZhou Du, Beijing (CN); Qiang Li, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/999,630

(22) PCT Filed: Apr. 1, 2010

(86) PCT No.: PCT/CN2010/071493
§ 371 (c)(1),
(2), (4) Date: Dec. 16, 2010

(87) PCT Pub. No.: WO2011/120228
PCT Pub. Date: Oct. 6, 2011

(65) Prior Publication Data
US 2013/0009943 A1    Jan. 10, 2013

(51) Int. Cl.
*G06T 15/40* (2011.01)
*H04N 13/04* (2006.01)

(52) U.S. Cl.
USPC .................. 345/421; 345/422; 348/51

(58) Field of Classification Search
USPC .................. 345/421, 422, 505; 348/51
See application file for complete search history.

(56) References Cited

U.S. PATENT DOCUMENTS

| 5,900,880 | A | 5/1999 | Cline et al. |
| 6,577,305 | B1 * | 6/2003 | Duluk et al. ............. 345/419 |
| 2004/0233987 | A1 | 11/2004 | Porikli et al. |
| 2011/0074784 | A1 * | 3/2011 | Turner et al. ............. 345/427 |

OTHER PUBLICATIONS

International Search Report and Written Opinion for International Patent Application No. PCT/CN2010/071493, Mailed Jan. 6, 2011, 10 pages.

* cited by examiner

*Primary Examiner* — Joni Richer
(74) *Attorney, Agent, or Firm* — Ryder, Lu, Mazzeo and Konieczny, LLC; Douglas J. Ryder

(57) ABSTRACT

A multi-core processor system may support 3D image rendering on an autostereoscopic display. The 3D image rendering includes pre-processing of depth map and 3D image wrapping tasks. The pre-processing of depth map may include a foreground prior depth image smoothing technique, which may perform a depth gradient detection and a smoothing task. The depth gradient detection task may detect areas with large depth gradient and the smoothing task may transform the large depth gradient into a linearly changing shape using low-strength, low-pass filtering techniques. The 3D image wrapping may include vectorizing the code for 3D image wrapping of row pixels using an efficient single instruction multiple data (SIMD) technique. After vectorizing, an API such as OpenMP may be used to parallelize the 3D image wrapping procedure. The 3D image wrapping using OpenMP may be performed on rows of the 3D image and on images of the multiple view images.

30 Claims, 5 Drawing Sheets

WARP3D-ROW (Pixels, disparities, width)
801  u ← 1
802  for x from 1 to width
803   do ΔSTEP 1: new position calculation
804     x' ← x + scalar * disparities [x] + Offset
805   Δ STEP 2: ascending order of x'
806   if x' < current_min
807     then x' ← current_min
808     else current_min ← x'
809   Δ STEP 3: new pixel calculation
810   while u < x' and u > Prev_x'
811     do Δ weight calculation
812       w1←(x'-u) / (x' - Prev_x')
813       w2←( u-Prev_x') / (x' - Prev_x')
814     Δ pixel interpolation
815       pixels_new [x'] ← ROUND
         (w1 * pixels [Prev_x'] + w2 * pixels [x'])
816       u ← u + 1
817  return pixels_new

*FIG. 8A*

WARP3D-ROW-SIMD-FRIENDLY (Pixels, disparities, width)
841  for x from 1 to width
842   do STEP 1: new position calculation
843     ... SIMD Code ....
844  for x from 1 to width
845   do STEP 2: ascending order keeping
846     .... Pure C Code .....
847  for x from 1 to width
848   do STEP 3: disparity region computation
849     .... SIMD Code to verify "u < x' and u > Prev_x' " ....
850  for x from 1 to width
851   do STEP 3: weight calculation and pixel interpolation
852     ...SIMD Code ....
853  return pixels_new

*FIG. 8B*

WARP3D-IMAGE-FINE-GRNL (Pixels, disparities, width, height)
861  #Pragma omp parallel for
862  for y from 1 to height
863   do for v from 1 to views
864     do Δ 3D wrapping for view # v, row# y
865       WRAP3D-ROW (...)

MULTI-CORE PROCESSOR SUPPORTING REAL-TIME 3D IMAGE RENDERING ON AN AUTOSTEREOSCOPIC DISPLAY

CROSS-REFERENCE TO RELATED APPLICATION

This patent application is a U.S. National Phase application under 35 U.S.C. §371 of International Application No. PCT/CN2010/071493, tiled on Apr. 1, 2010, entitled A MULTI-CORE PROCESSOR SUPPORTING REAL-TIME 3D IMAGE RENDERING ON AN AUTOSTEREOSCOPIC DISPLAY.

BACKGROUND

Rapid development in 3-dimensional (3D) display technologies and ever increasing interest of viewers in having high quality 3D-television (3D-TV) has led to development of glasses free auto-stereoscopic 3D display devices. Auto-stereoscopic 3D display devices are increasingly used in advertisement, entertainment, and other such industries. Auto-stereoscopic 3D display devices support multiple view images simultaneously and the multiple distinct views form a stereo vision in human visual system. As a result, the human beings viewing the display may not have to use 3D glasses or headgears and the viewers may view 3D images in bear eyes.

Generally, two formats are widely used to represent stereo video—1) multi-view images (i.e., left view+right view), and 2) 2D image+depth information, which is referred to 2.5D format. Representing the stereo video in the 2.5D format offers multiple advantages such as lower requirement of storage and transmission bandwidth, device independence to 3D display model, backward compatibility with traditional 2D display, for example. Generating multiple virtual view images for 3D image after receiving input signals (i.e., 2D input and depth image input) may be computationally intensive for auto-stereoscopic 3D display. To overcome the computationally intensive limitation, the 3D display devices may use separate field programmable gate array (FGPA) chips or a high-end graphics processing unit (GPU) to perform the computationally intensive tasks.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a multi-core processor, which may support real-time 3D image rendering on an auto-stereoscopic display. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, the 3D image rendering on an auto-stereoscopic display may be supported on a multi-core processor without using additional chips such as FPGA chips or graphics processing units (GPUs). In one embodiment, the 3D wrapping phase may include a process of synthesizing multiple virtual views from a 2-dimensional (2D) reference image and a depth map. In one embodiment, one or more virtual views may be generated by 3D image wrapping by back-projecting the pixels in a reference image to a 3D space and then re-projecting the pixels onto a target view point to create a virtual view. While back-projecting and re-projecting pixels (referred as view point moving) from one space to another, the occluded areas may be revealed. In one embodiment, the depth map may be pre-processed (or smoothened) to reduce the effect of occluded areas (or holes).

In one embodiment, the 3D image rendering may include one or more phases such as pre-processing of depth map, 3D wrapping, and hole-filling or post-processing phase to fill the exposed holes. In one embodiment, the pre-processing of depth map phase may include a foreground prior depth image smoothing technique. In one embodiment, the foreground depth image smoothing technique may include depth gradient detection task and smoothing task. In one embodiment, the depth gradient detection task may include detecting areas with large depth gradient and transforming the large depth gradient into a linearly changing shape. In one embodiment, while performing the smoothing task, the linearly changing shape may be pre-processed or smoothened using low-strength and low-pass filtering techniques. In one embodiment, a low-strength, low-pass Gaussian filter may be used to smoothen the linearly changing shape. As a result of using low-strength, low-pass Gaussian filter with a smaller window size (compared to high-strength low-pass filter with larger window size, which may used otherwise), the computationally intensiveness may be reduced substantially.

In one embodiment, after pre-processing the depth map using foreground prior depth image smoothing technique, a 3D wrapping technique, which may exploit data level parallelism (DLP) and thread level parallelism (TLP) may be used. In one embodiment, the 3D wrapping operation may include vectorizing the code for 3D image wrapping of row pixels using an efficient single instruction multiple data (SIMD) technique, which may allow data level parallelism to be exploited. After vectorizing the view image, an application programmable interface (API), which may support multi-platform shared memory multiprocessing programming such as OpenMP may be used to parallelize the 3D image wrapping procedure to exploit thread level parallelism. In one embodiment, the 3D image wrapping using OpenMP may be performed on each row of the 3D image and on each image of the multiple view images. As a result of vectorizing and parallelizing to, respectively, exploit data level parallelism (DLP) and thread level parallelism (TLP), a substantial amount of computation time may be saved.

Figure 1:
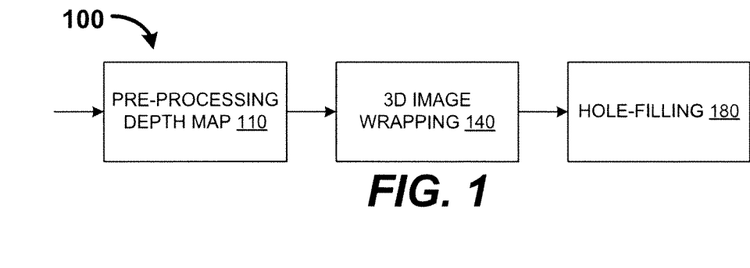
FIG. 1 illustrates a block diagram 100, which depicts generation multi-view images for an auto-stereoscopic display using a multi-core processor in accordance with one embodiment.

An embodiment of a rendering approach 100 used to render 3D images on an auto-stereoscopic display using a multi-core processor is illustrated in FIG. 1. In one embodiment, the rendering approach 100 may comprise a pre-processing of depth map phase 110, a 3D image wrapping phase 140, and a hole-filling phase 180.

In one embodiment, the pre-processing phase 110 may use foreground prior depth image based rendering (DIBR) technique to identify and reduce the depth gradients to minimize disocclusion effect. In one embodiment, in the pre-processing phase 110, the areas that have large depth gradient in the depth map of a captured image may be identified. In one embodiment, substantially large portions (first portions) of the depth map may be flat areas and the possibility of occurrence of holes in these flat areas may be minimal or zero. In one embodiment, small portions (second portions) of the depth map may comprise larger depth gradients and pre-processing (i.e., image smoothing operation) may be performed in these second portions.

In one embodiment, the second portions may be transformed into a linearly changing shape, which may computationally cheaper as compared to performing a convolution operation on the depth map using a high-strength low-pass Gaussian filter. In one embodiment, the second portions may be transformed into a linearly changing shape by changing the depth gradient of the at least some portions of the second portions to reduce the sharpness of the depth. After transforming the sharp depth gradient areas into a linearly changing shape, a low-strength, low-pass Gaussian filter with a smaller window-size (compared to the window size of the high-strength, low-pass Gaussian filter) may be used to smoothen the linearly changing shape. In one embodiment, the window size of the low-strength, low-pass Gaussian filter may be ⅓ of the window size of the high-strength, low-pass Gaussian filter.

In one embodiment, the foreground prior DIBR technique may conserve substantial amount of execution time compared to using convolution technique. Also, in one embodiment, the foreground prior DIBR technique may produce better visual effect compared to convolution approach to image smoothing. In one embodiment, the depth of the foreground may be preserved by the foreground prior DIBR approach to generate better visual effect on a new virtual image. A user may be attracted to the foreground of the new virtual image as compared to the background and preserving the depth of the foreground may allow users to experience a better visual effect. In one embodiment, the foreground prior DIBR technique may reduce effects such as stretching of the face due to distortion, which may enhance viewers' visual effect.

In one embodiment, the image may be further processed in a 3D wrapping phase 140 after the pre-processing phase 110 is concluded. In one embodiment, the 3D wrapping phase 140 may include two sub-phases—vectorization sub-phase and parallelization sub-phase. In one embodiment, during the vectorization sub-phase, a single instruction multiple data (SIMD) technique may be used to vectorize tasks involved in 3D image wrapping for a row of pixels. In one embodiment, the pseudo-code of FIG. 8A (that has close data dependence between adjacent pixels) may be decomposed into multiple loop structures (depicted in FIG. 8B) to reduce the data dependency between adjacent pixels. In one embodiment, using SIMD to vectorize the pseudo-code may exploit data level parallelism (DLP).

After vectorizing the image, an application programmable interface (API), which may support multi-platform shared memory multiprocessing programming on architectures including UNIX and Microsoft® Windows® platforms may be used to parallelize the 3D image wrapping procedure to exploit thread level parallelism. In one embodiment, an API such as OpenMP (Open Multi-processing) may be used to parallelize the 3D image wrapping technique to exploit thread level parallelism. In one embodiment, OpenMP may be used to perform the 3D image wrapping on each row of the 3D image and on each image of the multiple view images. As a result of vectorizing and parallelizing to, respectively, exploit data level parallelism (DLP) and thread level parallelism (TLP), a substantial amount of computation time may be saved.

Figure 2:
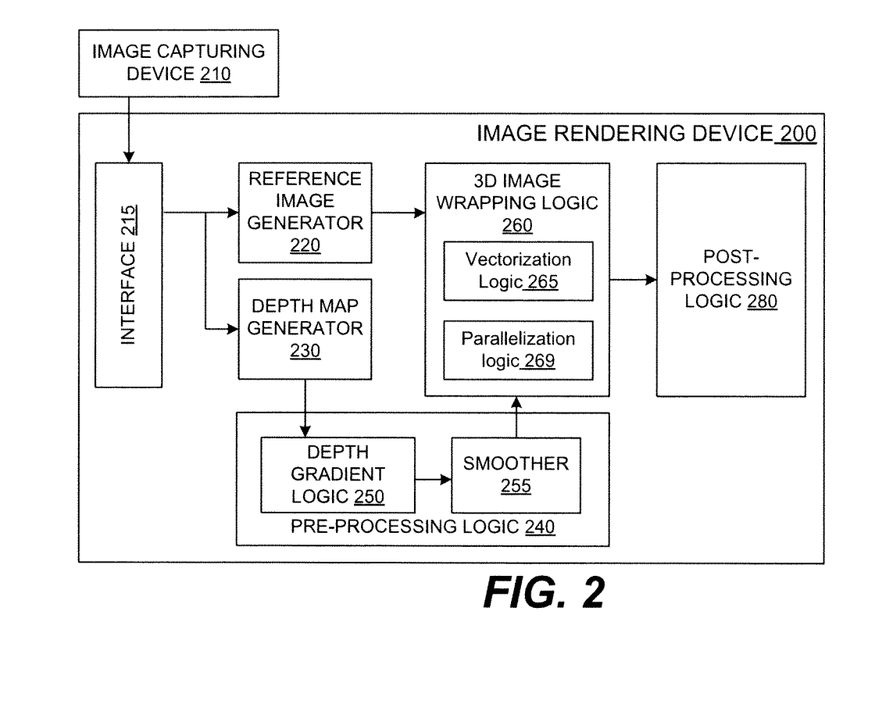
FIG. 2 illustrates a block diagram of an image rendering device (IRD) 200, which may generate 3D images for an auto-stereoscopic display using a multi-core processor in accordance with one embodiment.

An embodiment of an image rendering device 200, which may perform 3D image rendering is illustrated in FIG. 2. In one embodiment, the image rendering device (IRD) 200 may comprise an interface 215, reference image generator 220, a depth map generator 230, a pre-processing logic 240, an image wrapping logic 260, and a post-processing logic 280.

In one embodiment, the image rendering device 200 may be coupled to an image capturing device 210 such as a camera for capturing video (or image) and associated per-pixel depth information (referred to as "depth map"). In one embodiment, the captured image and the depth map to the interface 215. In one embodiment, the interface 215 may receive the captured image and the depth map and may provide the depth map and the captured image over an internal bus. In one embodiment, the interface 215 may provide physical, electrical, and protocol interface between the image capturing device 210 and the image rendering device 200.

Figure 4:
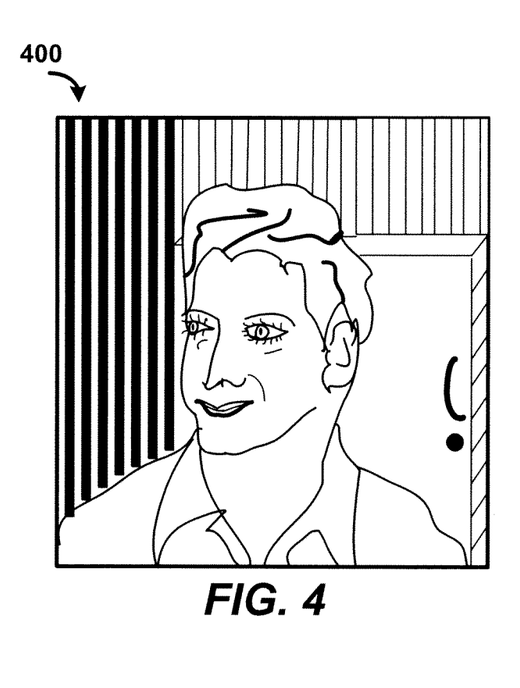
FIG. 4 illustrates an image 400 from which a 3D image may be generated for an auto-stereoscopic display using a multi-core processor in accordance with one embodiment.

In one embodiment, the reference image generator 220 may generate a reference image, such as an image depicted in FIG. 4, in response to receiving data on the internal bus. In one embodiment, the reference image generator 220 may capture the pixel value for each pixel in the image and generate a reference image. In one embodiment, the reference image may be provided to the image wrapping logic 260.

Figure 5:
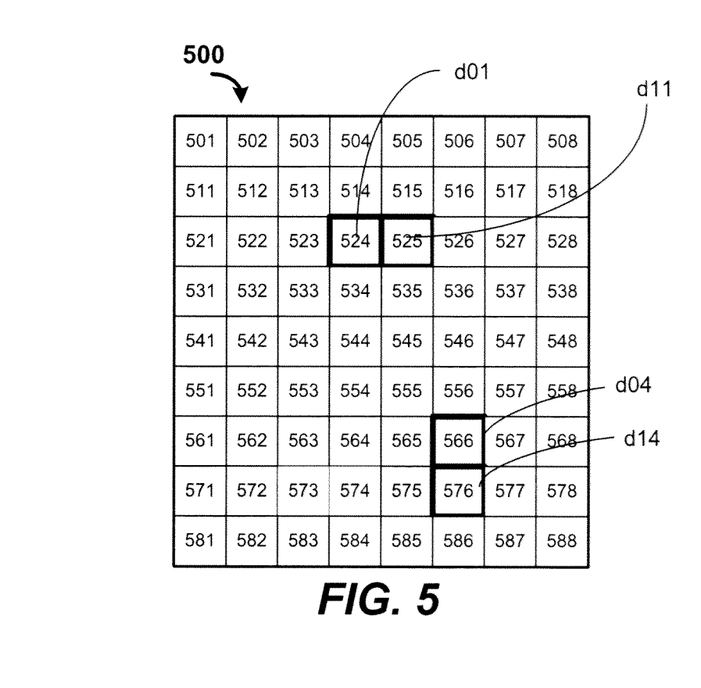
FIG. 5 is a pixel diagram of the image 400 that may be used to perform depth smoothing in a depth-image-based-rendering (DIBR) technique generate 3D images for an auto-stereoscopic display using a multi-core processor in accordance with one embodiment.

In one embodiment, the depth map generator 230 may generate a depth map, such as a depth map depicted in FIG. 5, in response to receiving data on the internal bus. In one embodiment, the depth map generator 230 may extract the per-pixel depth information form the data to generate the depth map. In one embodiment, the depth map generator 230 may provide the depth map to the pre-processing block 240.

In one embodiment, the pre-processing block 240 may detect areas (second portions) within the depth map having large depth gradient and reduce the sharpness of the large depth gradients by transforming the large depth gradient into linearly changing shape. In one embodiment, the linearly changing shape may be further smoothened. In one embodiment, the pre-processing block 240 may comprise a depth gradient logic 250 and a smoother 255. In one embodiment, the depth gradient logic 250 may detect or identify the second portions within the depth map that may have large or sharp depth gradient. In one embodiment, the depth gradient logic 250 may compare the gradient level of each pixel with an upper limit value (gmax) to determine whether the depth gradient is sharp or large. In one embodiment, the depth gradient logic 250 may select a first pixel and a second pixel, which may be adjacent to the first pixel. In one embodiment, the depth gradient logic 250 may determine a first depth value (d0) of the first pixel and the second depth value (d1) of a second pixel, which may be in an adjacent position to that of the first pixel. In one embodiment, the depth gradient logic 250 may determine the difference in depth gradient (i.e., (d1−d0)) and compare the difference in depth gradient with a maximum threshold value for depth (gmax) to determine if the depth is sharp or large.

In one embodiment, the depth gradient logic 250 may identify the areas, which may have large depth gradient by comparing the depth gradient value of the adjacent pixels. In one embodiment, the depth gradient logic 250 may identify the second areas formed by adjacent pixels (524 and 525) and (566 and 576), which may have large depth gradients. In one embodiment, the depth gradient logic 250 may determine that depth gradient of the adjacent pixels is large if the difference in the depth gradients of the adjacent pixels is greater than the upper limit (gmax). Further, the depth gradient logic 250 may transform the areas with large depth gradient to a linearly changing shape as described below.

In one embodiment, the depth gradient logic 250 may determine the depth values d01 and d04, respectively, of the pixels (first pixels) 524 and 566 and the depth values d11 and d14, respectively, of the adjacent pixels (second pixels) 525 and 576. In one embodiment, the depth gradient logic 250 may determine the difference values diff1 (=d11−d01) and diff4 (=d14−d04), respectively, using the depth values of the pixels (524 and 525) and (566 and 576). In one embodiment, the depth gradient logic 250 may compare the difference values diff1 and diff4 in the depth values of the pixels (524 and 525) and (566 and 576) with the upper limit gmax to determine if the area has a sharp or large depth gradient.

In one embodiment, if (d1−d0) is greater than gmax, the depth gradient logic 250 may set the depth value (d0) of the first pixel to a new depth value d0(new)=(d1−gmax). As a result, the large depth gradient may be transformed into a linearly changing shape as depicted in FIG. 6D. In one embodiment, in the above example, the depth gradient logic 250 may use the difference values diff1 and diff4 values of the adjacent pixels (524 and 525) and (566 and 576) and the upper limit gmax to transform the large or sharp depth gradient of the pixels 524 and 566 into a linearly changing shape. In one embodiment, the depth gradient logic 250 may set the depth value (d01) of the pixel 524 to a new depth value (d01)new= (d11−gmax). Similarly, the depth gradient logic 250 may set the depth value (d04) of the pixel 566 to a new depth value (d04)new=(d14−gmax).

Figure 6A:
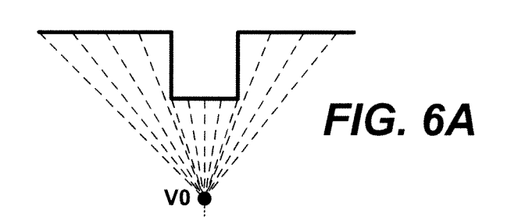
FIG. 6 illustrates a depth smoothing technique, which may reduce the computation time and improve the visual effect while generating 3D images for an auto-stereoscopic display using a multi-core processor in accordance with one embodiment.
Figure 6B:
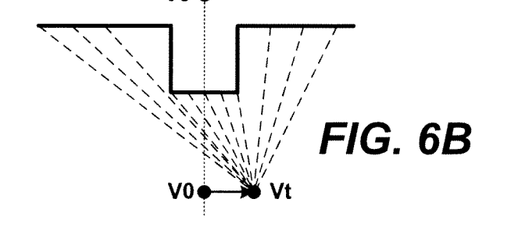

In one embodiment, an original view point (V0) generated using a reference image (2D image) of FIG. 4 is depicted in FIG. 6A. The reference image (2D image) and the depth map may be used to generate virtual view and one a virtual view point (Vt) of one such virtual view is depicted in FIG. 6B. As depicted in FIG. 6B, the view point (v0) may move to a new position Vt and such a movement may cause disocclusion, which may be caused due to a sharp depth gradient in some areas (seconds areas) with the depth map.

Figure 6C:
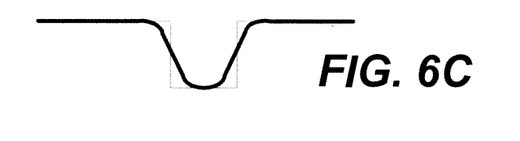
Figure 6D:
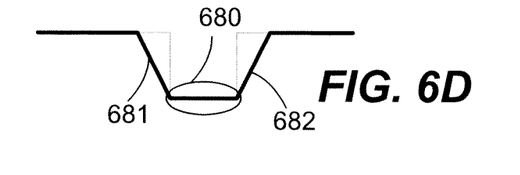
Figure 6E:
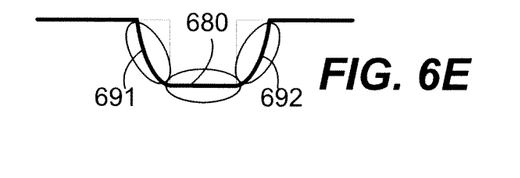

In one embodiment, the smoother 255 may receive the linearly changing shape and perform a low pass filtering using a low strength, low pass Gaussian filter. In one embodiment, the low strength, low pass Gaussian filter may comprise a small window-size to perform image smoothing. In one embodiment, the size of the window of the low strength, low pass Gaussian filter may equal ⅓ the size of the window of a high strength low pass Gaussian filter. A prior approach that uses convolution of depth map to smoothen the image may use a high strength low pass Gaussian filter. The smoothing performed using convolution of the depth map is depicted in FIG. 6C. The convolution operation may consume a considerable amount (38.7%) of the DIBR execution time and the computational intensiveness and the size of the window of the high strength low pass Gaussian filter may be high as well. In one embodiment the computation demand may be greatly saved by using low strength low pass Gaussian filter. However, by transforming the sharp depth gradient into a linearly changing shape, a low strength low pass Gaussian filter may be used to smoothen the sharp depth gradient (681 and 682 of FIG. 6D) and the depth smoothing may be as depicted by the smoothened lines 691 and 692 in FIG. 6E. In one embodiment, the smoother 255 may generate a smoothened depth map, which may be provided to the 3D image wrapping block 260.

Also, in one embodiment, the foreground depth may be preserved (as shown by 680 in FIG. 6E) that may improve the visual effect compared to convolution smoothing approach. A user may be attracted to the foreground of the new virtual image as compared to the background and preserving the depth of the foreground may allow users to experience a better visual effect. In one embodiment, the foreground prior DIBR technique may reduce effects such as stretching of the face due to distortion, which may enhance viewers' visual effect.

Figure 7:
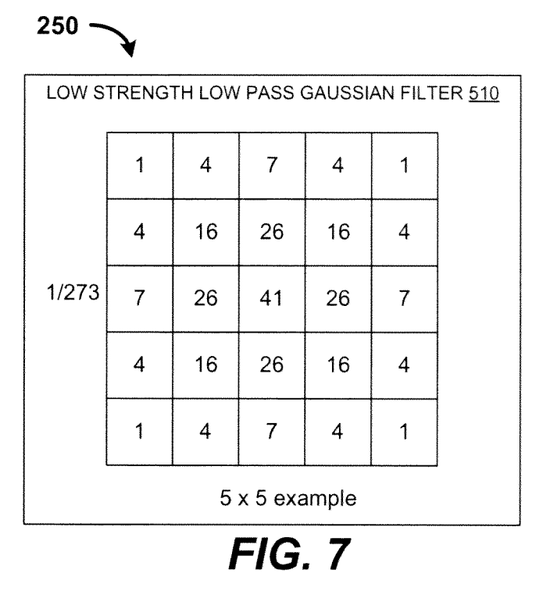
FIG. 7 illustrates a structure of a low-strength Gaussain filter used to reduce the computation time and improve the visual effect while generating 3D images for an auto-stereoscopic display using a multi-core processor in accordance with one embodiment.

In one embodiment, the structure of the low strength low pass Gaussian filter is depicted in FIG. 7. In one embodiment, the low strength low pass Gaussian filter may be realized using binary weighing technique. In one embodiment, the Gaussian filter of FIG. 7 depicts an approximation of a Gauss bell function and the values represent weight factors.

Figure 8A:
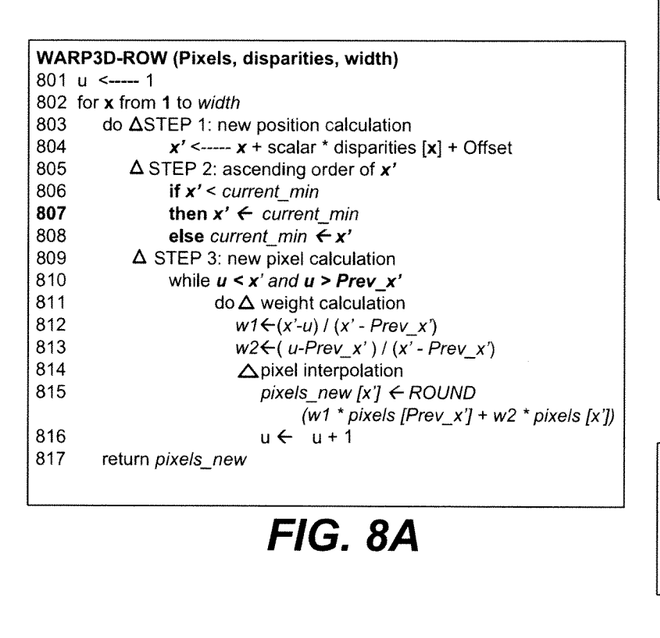
FIG. 8B illustrates a code to vectorize 3D image wrapping of row pixels in DIBR shown in FIG. 8A using SIMD technology to exploit data level parallelization while generating 3D images for an auto-stereoscopic display using a multi-core processor in accordance with one embodiment.
FIG. 8C illustrates a code to parallelize 3D image wrapping of row pixels in DIBR shown in FIG. 8A to exploit thread level parallelism while generating 3D images for an auto-stereoscopic display using a multi-core processor in accordance with one embodiment.
Figure 8B:
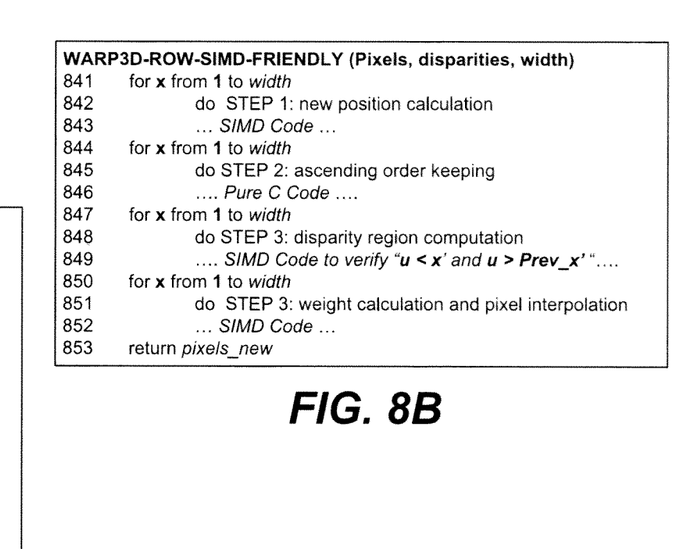

In one embodiment, the 3D image wrapping block 260 may generate multiple virtual images after receiving the smoothened depth map and the reference image (of FIG. 4, for example). In one embodiment, the 3D image wrapping block 260 may include a vectorization logic 265 and a parallelization logic 269. In one embodiment, the vectorization logic 265 may use a single instruction multiple data (SIMD) technique to vectorize tasks involved in 3D image wrapping of a row of pixels. For example, a pseudo-code for performing the 3D image wrapping is depicted in FIG. 8A and the hole-filling module is often merged into the 3D image wrapping module in a DIBR implementation. Due to close data dependence between the adjacent pixel data, it may not be possible to use SIMD technology to vectorize the tasks involved in 3D image wrapping.

In one embodiment, the vectorization logic 265 may identify the serial tasks in which current pixel data may depend on a previous position of the current pixel. In one embodiment, the vectorization logic 265 may decompose the 'for' loop in line 802 of FIG. 8A into four separate 'for' loops depicted in lines 841, 844, 847, and 850 of FIG. 8B. In one embodiment, decomposing the 'for' loop in line 802 into four separate 'for' loops in lines 841, 844, 847, and 850 may allow the 3D image wrapping logic 260 to be programmed using SIMD technology. As a result of using SIMD technology for programming, the vectorization logic 265 may data level parallelism (DLP). In one embodiment, the vectorization logic 265 may decompose the task of new pixel calculation in line 809 of FIG. 8A into two sub-tasks such as 'disparity region checking' depicted in line 848 of FIG. 8B and 'weight calculation for pixel interpolation' depicted in line 851 of FIG. 8B. In one embodiment, the results of the 'for' loop in line 847 of FIG. 8B may provided as inputs to the 'for' loop in line 850. In one embodiment, the vectorization logic 265 may support use of SIMD technology to exploit DLP and conserve a considerable amount of computation time compared to that of FIG. 8A.

Figure 8C:
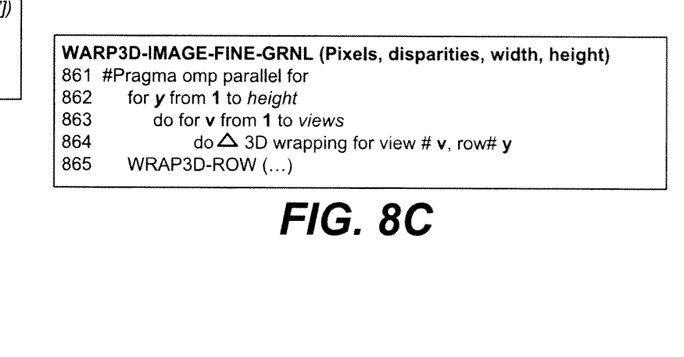

In one embodiment, the parallelization logic 269 may parallelize the 3D image wrapping procedure to exploit thread level parallelism. In one embodiment, the parallelization logic 269 may support an application programmable interface (API), which may support multi-platform shared memory multiprocessing programming on architectures including UNIX and Microsoft® Windows® platforms. In one embodiment, the parallelization logic 269 may use the API to parallelize the 3D image wrapping procedure to exploit thread level parallelism. In one embodiment, the parallelization logic 269 may use an API such as OpenMP (Open Multi-Processing) to parallelize the 3D image wrapping technique. In one embodiment, OpenMP may be used to perform the 3D image wrapping on each row of the 3D image and on each image of the multiple view images. In one embodiment, the parallelization logic 269 may parallelize the 3D image wrapping procedure by performing the basic task of wrapping pixels of each in the view image over all the rows within the image and over multiple view images. In one embodiment, the pseudo-code, which may be used for parallelizing the 3D image wrapping is depicted in FIG. 8C.

As a result of vectorizing and parallelizing to, respectively, exploit data level parallelism (DLP) and thread level parallelism (TLP), a substantial amount of computation time may be saved. In one embodiment, the post-processing logic 280 may fill the exposed holes.

Figure 3:
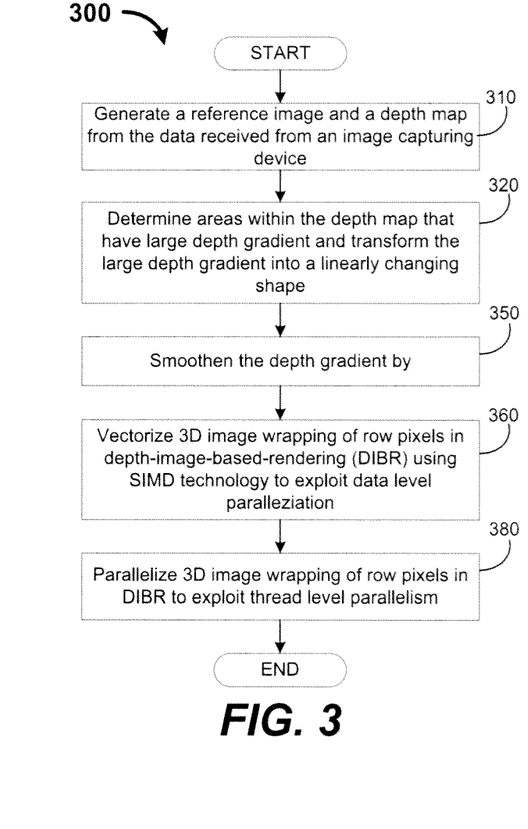
FIG. 3 is a flow-chart 300, which illustrates an operation of the image rendering device IRD 200 while generating 3D images for an auto-stereoscopic display using a multi-core processor in accordance with one embodiment.

An embodiment of an operation of the image rendering device 200 is depicted in a flow-chart of FIG. 3. In block 310, the image rendering device 200 may generate a reference image 400 depicted in FIG. 4 using the reference image generator 220 and a depth map 500 depicted in FIG. 5 using the depth map generator 230.

In block 320, the image rendering device 200 may use the depth gradient logic 250 to determine the second areas within the depth map 500 that may have large depth gradient and transform the large depth gradient into a linearly changing shape. In one embodiment, the image rendering device 200 may determine the depth gradient (d0 and d1) of adjacent pixels and then compare the difference (d1−d0) in the depth gradient of the adjacent pixels with an upper limit (gmax) to determine the second areas with large depth gradient. In one embodiment, the depth gradient logic 250 may determine if (d1−d0) is greater than gmax and the depth gradient logic 250 may set d0=(d1−gmax) if (d1−d0) is greater than gmax. As a result, the large depth gradient may be transformed into a linearly changing shape as depicted in FIG. 6D.

In block 350, the image rendering device 200 may use the smoother 255 to smoothen the linearly changing shape of FIG. 6D. In one embodiment, the smoother 255 may comprise a low strength, low pass Gaussian filter. In one embodiment, the smoother 255 may generate a depth smoothened curve as depicted by lines 691 and 692 of FIG. 6E.

In block 360, the image rendering device 200 may use the vectorization logic 265 to vectorize the 3D image wrapping of row pixels in DIBR using SIMD technology to exploit DLP. In one embodiment, the vectorization procedure using SIMD technology is described above with reference to FIG. 8B.

In block 380, the image rendering device 200 may use the parallelization logic 269 to parallelize the 3D image wrapping of row pixels within an image and over multiple view images to exploit TLP as described above with reference to FIG. 8C.

Figure 9:
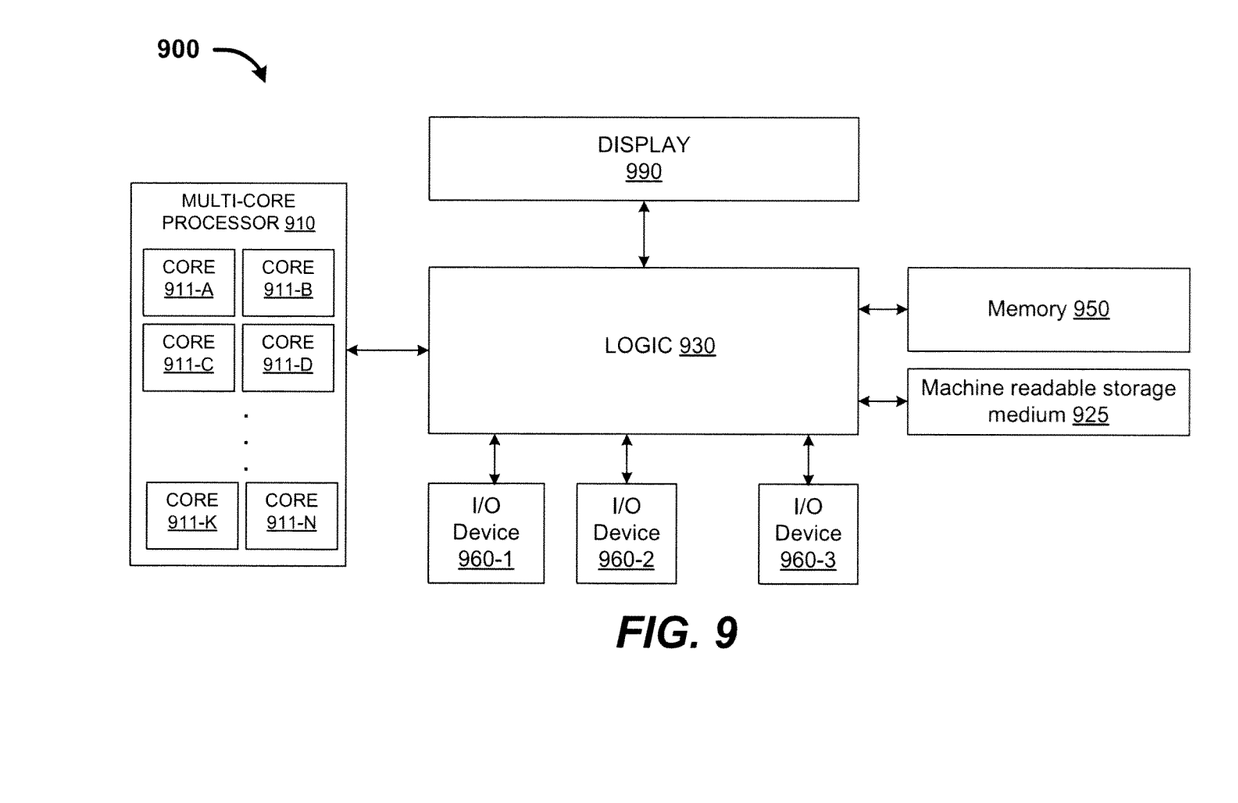
FIG. 9 illustrates a computer system that may generate 3D images for an auto-stereoscopic display using a multi-core processor in accordance with one embodiment.

An embodiment of a computer system 900 comprising a multi-core processor, which may support rendering of 3D images on autostereoscopic display is illustrated in FIG. 9. Referring to FIG. 9, the computer system 900 may include a general purpose multi-core processor (or CPU) 910 including a single instruction multiple data (SIMD) processor. In one embodiment, the CPU 910 may include multiple cores such as core 911-A to 911-N to support tasks performed by the image rendering device 200 to render 3D images on display 990, which may include an autostereoscopic display. The CPU 910, in one embodiment, may perform rendering of 3D images on an autostereoscopic display in addition to performing various other tasks or store a sequence of instructions, to rendering of 3D images on an autostereoscopic display in a machine readable storage medium 925. However, the sequence of instructions may also be stored in the memory 950 or in any other suitable storage medium.

The processor or CPU 910 that operates the computer system 900 may be coupled to logic 930. The logic 930 may be coupled to one or more I/O devices 960 such as image capturing device 210, which may provide interface the computer system 900. The logic 930, for example, could be a chipset logic in one embodiment. The logic 930 may be coupled to the memory 950 or a machine readable storage device 925, which can be any kind of storage, including optical, magnetic, or semiconductor storage.

In one embodiment, the cores 911 of the CPU 910 may perform 3D image rendering tasks, which may include tasks such as pre-processing of depth map, 3D wrapping, and hole-filling or post-processing phase to fill the exposed holes. In one embodiment, one or more cores, together or individually, may support foreground prior DIBR technique. In one embodiment, the core 911-A may support depth gradient detection task performed by the depth gradient logic 250, for example. In one embodiment, the core 911-B may support smoothing operation performed by the smoother 255. In other embodiment, same core such as the core 911-A may perform both the tasks performed by logics 250 and 255. In yet other embodiment, the tasks performed by the logic 250 and 255 may be shared by more than one core 911. In one embodiment, the core(s) that is assigned with the pre-processing tasks may perform the depth detection task and depth smoothing task as described above.

In one embodiment, after pre-processing the depth map using foreground prior depth image smoothing technique, the core 911 may perform a 3D wrapping technique, which may exploit data level parallelism (DLP) and thread level parallelism (TLP). In one embodiment, at least one of the cores 911 may perform the 3D wrapping operation, which may include vectorizing the code for 3D image wrapping of row pixels using an efficient single instruction multiple data (SIMD) technique. After vectorizing the view image, the same core 911 or other one of the cores may support an application programmable interlace (API), which may support multi-platform shared memory multiprocessing programming such as OpenMP. In one embodiment, the core 911 may be used to parallelize the 3D image wrapping procedure to exploit thread level parallelism. In one embodiment, the 3D image wrapping using OpenMP may be performed on each row of the 3D image and on each image of the multiple view images. As a result of vectorizing and parallelizing to, respectively, exploit data level parallelism (DLP) and thread level parallelism (TLP), a substantial amount of computation time may be saved.

The graphics processing techniques described herein may be implemented in various hardware architectures. For example, graphics functionality may be integrated within a chipset. As still another embodiment, the graphics functions may be implemented by a general purpose processor, including a multi-core processor or as a set of software instructions stored in a machine readable medium.

What is claimed is:

1. A method in a multi-core processor, comprising:
    identifying second portions of an image having large depth gradient that is greater than a maximum threshold value, wherein the second portions are substantially small compared to first portions with small depth gradient that is lesser than the maximum threshold value,
    transforming the large depth gradient of the second portions into a linearly changing shape,
    smoothening the linearly changing shape using a low-strength, low-pass filtering technique,
    vectorizing row pixels of the image using single instruction multiple data technique, and
    parallelizing a three dimensional image wrapping operation over row pixels of the image and over row pixels of a plurality of view images that together form a three dimensional image to be rendered on an autostereoscopic display.

2. The method of claim 1, wherein identifying the second portions comprises,
    selecting a first pixel and a second pixel,
    determining a difference value generated from a difference of a first depth value of the first pixel and a second depth value of the second pixel, and
    comparing the difference value with the maximum threshold value.

3. The method of claim 2, wherein the second pixel is a pixel that is adjacent to the first pixel.

4. The method of claim 2, wherein transforming the large depth gradient comprises setting the first depth value of the first pixel to new depth value if the difference between the second depth value and the first depth value is greater than the maximum threshold value.

5. The method of claim 4, wherein the new depth value is determined based on a difference of the second depth value and the maximum threshold value.

6. The method of claim 1 further comprises preserving foreground depth information while transforming the large depth gradient into the linearly changing shape.

7. The method of claim 1, wherein vectorizing the row pixels of the image comprises decomposing tasks into sub-tasks to reduce data dependency between the tasks.

8. The method of claim 7, wherein vectorizing the row pixels of the image is to provide data level parallelism.

9. The method of claim 1 comprises supporting an application programmable interface to support parallelizing the three dimensional image wrapping of row pixels of the plurality of images.

10. The method of claim 9, wherein parallelizing the three dimensional image wrapping of row pixels of the plurality of images is to provide thread level parallelism.

11. An image rendering device in a processor, comprising:
    a depth gradient logic, wherein the depth gradient logic is to,
        identify second portions of an image having large depth gradient that is greater than a maximum threshold value, wherein the second portions are substantially small compared to first portions that have small depth gradient that is lesser than the maximum threshold value, and
        transform the large depth gradient of the second portions into a linearly changing shape,
    a smoother coupled to the depth gradient logic, wherein the smoother is to perform depth smoothing of the linearly changing shape using a low-strength, low-pass filter,
    a vectorizing logic coupled to the smoother, wherein the vectorizing logic is to vectorize row pixels of the image using single instruction multiple data technique, and
    a parallelizing logic coupled to the vectorizing logic, wherein the parallelizing logic is to parallelize a three dimensional image wrapping operation over row pixels of the image and over row pixels of a plurality of view images that together form a three dimensional image to be rendered on an autostereoscopic display.

12. The image rendering device of claim 11, wherein the depth gradient logic is to, select a first pixel and a second pixel from the image, determine a difference value generated from the difference of a first depth value of the first pixel and a second depth value of the second pixel, and compare the difference value with the maximum threshold value.

13. The image rendering device of claim 12, wherein the second pixel is a pixel that is adjacent to the first pixel.

14. The image rendering device of claim 12, wherein the depth gradient logic is to set the first depth value of the first pixel to a new depth value if the difference between the second depth value and the first depth value is greater than the upper limit value.

15. The image rendering device of claim 14, wherein the depth gradient logic is to generate the new depth value based on a difference of the second depth value and the maximum threshold value.

16. The image rendering device of claim 11, wherein the smoother is to preserve the foreground depth information while performing depth smoothing of the linearly changing shape.

17. The image rendering device of claim 11, wherein the vectorizing logic is to vectorize the row pixels of the image by decomposing tasks into sub-tasks to reduce data dependency between the tasks.

18. The image rendering device of claim 17, wherein vectorizing the row pixels of the image is to provide data level parallelism.

19. The image rendering device of claim 11, wherein the parallelizing logic is to support an application programmable interface to support parallelizing the three dimensional image wrapping of row pixels of the plurality of images.

20. The image rendering device of claim 19, wherein parallelizing the three dimensional image wrapping of row pixels of the plurality of images is to provide thread level parallelism.

21. A computer system for rendering three dimensional image, comprising:

a multi-core processor, wherein the multi-core processor is to, identify second portions of an image having large depth gradient that is greater than a maximum threshold value, wherein the second portions are substantially small compared to first portions that have small depth gradient that is lesser than the maximum threshold value and transform the large depth gradient of the second portions into a linearly changing shape, transform the first depth gradient into a linearly changing shape, smoothen the linearly changing shape using a low-strength, low-pass filtering technique, and vectorize row pixels of the image using single instruction multiple data technique, and parallelize a three dimensional image wrapping over row pixels of the image and over row pixels of a plurality of view images that form a three dimensional image, a logic coupled to the multi-core processor, wherein the logic is to support transfer of the plurality of view images from the multi-core processor, and a display coupled to the logic, wherein the display is to support rendering the plurality of view images processed by the multi-core processor into a three dimensional image.

22. The computer system of claim 21, wherein the multi-core processor includes a first core to, select a first pixel and a second pixel that is adjacent to the first pixel, determine a difference value generated from the difference of a first depth value of the first pixel and a second depth value of the second pixel, and compare the difference value with an upper limit value.

23. The computer system of claim 22, wherein the first core is to identify the first pixel and the second pixel as a first area among the areas that have at least the first depth gradient.

24. The computer system of claim 22, wherein the first core is to set the first depth value of the first pixel to new depth value if the difference between the second depth value and the first depth value is greater than the upper limit value.

25. The computer system of claim 24, wherein the first core is to assign a difference of the second depth value and the upper limit value to the new value before setting the first depth value of the first pixel with the new value.

26. The computer system of claim 21, wherein the first core is to preserve the foreground depth information while transforming the first depth gradient into the linearly changing shape.

27. The computer system of claim 21, the multi-core processor further comprises a second core, wherein the second core is to vectorize the row pixels of the image by decomposing tasks into sub-tasks to reduce data dependency between the tasks to exploit data level parallelism.

28. The computer system of claim 21, wherein the second core is to support an application programmable interface to support parallelizing the three dimensional image wrapping of row pixels of the plurality of images.

29. The computer system of claim 28, wherein parallelizing the three dimensional image wrapping of row pixels of the plurality of images is to provide thread level parallelism.

30. The computer system of claim 21, further comprises a third core to transfer the plurality of view images to the display, which includes an autostereoscopic display.

* * * * *